United States Patent
Jung et al.

(10) Patent No.: US 11,448,570 B2
(45) Date of Patent: Sep. 20, 2022

(54) METHOD AND SYSTEM FOR UNSUPERVISED ANOMALY DETECTION AND ACCOUNTABILITY WITH MAJORITY VOTING FOR HIGH-DIMENSIONAL SENSOR DATA

(71) Applicants: Palo Alto Research Center Incorporated, Palo Alto, CA (US); Panasonic Corporation, Kadoma (JP)

(72) Inventors: Deokwoo Jung, Mountain View, CA (US); Fangzhou Cheng, Mountain View, CA (US); Ajay Raghavan, Mountain View, CA (US); Yukinori Sasaki, Hyogo (JP); Akira Minegishi, Osaka (JP); Tetsuyoshi Ogura, Osaka (JP); Yosuke Tajika, Hyogo (JP)

(73) Assignees: Palo Alto Research Center Incorporated, Palo Alto, CA (US); Panasonic Holdings Corporation, Kadoma (JP)

( * ) Notice: Subject to any disclaimer, the term of this patent is extended or adjusted under 35 U.S.C. 154(b) by 196 days.

(21) Appl. No.: 16/431,571

(22) Filed: Jun. 4, 2019

(65) Prior Publication Data

US 2020/0386656 A1    Dec. 10, 2020

(51) Int. Cl.
*G01M 99/00*    (2011.01)

(52) U.S. Cl.
CPC ................. *G01M 99/005* (2013.01)

(58) Field of Classification Search
CPC combination set(s) only.
See application file for complete search history.

(56) References Cited

U.S. PATENT DOCUMENTS

| | | | |
|---|---|---|---|
| 2008/0208781 A1* | 8/2008 | Snyder | G06N 20/00 706/20 |
| 2011/0276828 A1* | 11/2011 | Tamaki | G05B 23/0254 714/26 |
| 2017/0161231 A1* | 6/2017 | Liu | G06F 30/20 |
| 2017/0262818 A1* | 9/2017 | Horrell | G06Q 10/0635 |
| 2017/0284896 A1* | 10/2017 | Harpale | G01M 15/14 |
| 2018/0231394 A1* | 8/2018 | Goh | G05B 23/024 |
| 2019/0135300 A1* | 5/2019 | Gonzalez Aguirre | G06N 3/088 |
| 2020/0322366 A1* | 10/2020 | Yan | G06N 20/00 |

\* cited by examiner

*Primary Examiner* — Jennifer Bahls
(74) *Attorney, Agent, or Firm* — Shun Yao; Yao Legal Services, Inc.

(57) ABSTRACT

One embodiment can provide a system for detecting anomaly for high-dimensional sensor data associated with one or more machines. During operation, the system can obtain sensor data from a set of sensor associated with one or machines, apply data exploration techniques on the sensor data to automatically process sensor data to identify a subset of feature sensors from the available set of feature sensors, apply an unsupervised machine-learning technique to the identified subset of feature sensors and the target sensor to learn a set of pair-wise univariate models, and determine whether and how an anomaly occurs in the operation of the one or more machines based on the set of pair-wise univariate models.

20 Claims, 13 Drawing Sheets
(4 of 13 Drawing Sheet(s) Filed in Color)

Algorithm 1: Anomaly Detection Algorithm with Majority Voting

Input : $\{(x_{ij}, y_i) | i = 1 \cdots n, j = 1 \cdots p\}, U_{tr}$
    Output: $\{z_i \in \{0, 1\} | i = 1 \cdots n\}$
1  for $j \leftarrow 1$ to $p$ do
2     *sensor data normalization*;
3     $(\mu_{x_j}, \mu_y) \leftarrow (\sum_i x_{ij}/n, \sum_i y_i/n)$
4     $(\sigma^2_{x_j}, \sigma^2_y) \leftarrow (\sum_i (x_{ij} - \mu_{x_j})^2/n, \sum_i (y_i - \mu_y)^2/n)$
5     $(x_{ij}, y_i) \leftarrow ((x_{ij} - \mu_{x_j})/\sigma^2_{x_j}, (y_i - \mu_y)/\sigma^2_y)$
6     *linear regression model*;
7     $\beta_j \leftarrow \frac{\sum_i x_{ij} y_i}{\sum_i x_{ij}^2}, d_{ij} \leftarrow \frac{|y_i - \beta_j x_{ij}|}{\sqrt{\beta_j^2 + 1}}, R_j^2 \leftarrow \beta_j^2$
8     *anomaly model*;
9     $(\mu_{d_j}, \sigma^2_{d_j}) \leftarrow (\sum_i d_{ij}/n, \sum_i (d_{ij} - \mu_{d_j})^2/n)$
10    $d_{ij} \leftarrow (d_{ij} - \mu_{d_j})/\sigma^2_{d_j}$
11    $g_j \leftarrow GMM(\{d_{ij}\}_{i=1\ldots n}, k=2)$ where $\mu_0 < \mu_1$
12    $v_{ij} \leftarrow g_j(d_{ij})$
13 end
14 *majority voting*;
15 for $i \leftarrow 1$ to $n$ do
16    $s_{ij} \leftarrow R_j^2 d_{ij}, w_{ij} \leftarrow s_{ij}/\sum_j s_{ij}$
17    $u_i \leftarrow \sum_j w_{ij} v_{ij}$
18    $z_i \leftarrow 1$ if $u_i > U_{th}$, else $z_i \leftarrow 0$
19 end

FIG. 9

METHOD AND SYSTEM FOR UNSUPERVISED ANOMALY DETECTION AND ACCOUNTABILITY WITH MAJORITY VOTING FOR HIGH-DIMENSIONAL SENSOR DATA

BACKGROUND

Field

This disclosure is generally related to a system and method for anomaly detection in operation of industrial machines or systems. More specifically, this disclosure is related to detection of anomaly in high-dimensional sensor data.

RELATED ART

With the increasing use of Internet of Things (IoT) enabled equipments in numerous industrial applications, e.g., digital manufacturing, a large amount of sensor data is readily available. Such sensor data include actionable information that can be used to optimize operational efficiency of factory machines. In particular, detecting operation anomalies has been one of the most pursued objectives for its immediate application to reduce factory downtime and improve productivity and efficiency in manufacturing processes. However, it is a challenging task to develop anomaly detection techniques that can reliably scale to various settings in different factory setups. This is because the sensor data can be ill-conditioned due to poor data quality and lack of label information. For example, the sensor data can include a large number of missing, corrupted, noisy and highly correlated values.

Many real-world industry IoT applications do not perform optimally due to the ill-conditioned nature of available sensor data. Without appropriate data pre-processing and model selection, parameter estimation is prone to large bias and distortion which would lead to significant errors in anomaly detection. To avoid such errors, a data pre-processing stage is often needed to select, filter, and resample sensor data.

In conventional anomaly detection approaches for industry IoT applications, such data pre-processing is performed with prior domain knowledge of sensor data, and often without much automation. Due to the difficulty of obtaining labeled sensor data and lack of a fully automated anomaly detection method, the conventional approaches at best provide unreliable anomaly detection over different data sets. Furthermore, labeled datasets are rarely available or expensive to be obtained. In other words, there is no a priori knowledge about which points are normal or abnormal. Therefore, a clear definition of anomaly is not given. Without a normal or abnormal example, there is a need to perform unsupervised learning from the available sensor data. Such unsupervised learning can impose significant constraints on algorithm development, because an inherent performance trade-off exists between precision and recall (e.g., sensitivity), which in turn can cause unreliability of anomaly detection over different data sets. To make anomaly detection methods scale well to real-world applications, anomaly analysis workflow needs to be automated for data pre-processing, model selection, and anomaly detection.

SUMMARY

According to one embodiment of the present invention, a system for detecting anomalies for high-dimensional senor data associated with one or more machines is provided. During operation, the system can obtain sensor data from a set of sensors associated with the machine, with the set of sensors including a target sensor and a set of feature sensors, apply data exploration techniques to the sensor data to identify a subset of feature sensors from the set of feature sensors, apply an unsupervised machine-learning technique to the identified subset of feature sensors and the target sensor to learn a set of pair-wise univariate models, and determine whether and how an anomaly occurs in the operation of the one or more machines based on the set of pair-wise univariate models.

In a variation on this embodiment, applying the data exploration techniques can include one or more of: applying a data pre-processing technique, applying a data cleansing technique, and applying a feature engineering technique.

In a variation on this embodiment, applying the data cleansing technique includes: replacing missing values in the sensor data by linear interpolation, when an amount of the missing values during a recording period of target sensor data is less than a threshold value; and dropping missing values in the sensor data, when the amount of missing values during the recording period of the target sensor data is more than the threshold value.

In a variation on this embodiment, applying the feature engineering technique includes: adjusting a set of time delays between a set of feature sensors and target sensor; computing a correlation between the delay adjusted set of feature sensors and the target sensor; and ranking the set of feature sensors based on their correlation values.

In a further variation, each pair-wise univariate anomaly model from the set of pair-wise univariate anomaly models can be associated with a feature sensor from the subset of feature sensors and a target sensor.

In a further variation on this embodiment, the unsupervised machine-learning technique includes: determining a set of regression coefficients for measuring a fitness of the set of pair-wise univariate anomaly models; and using the set of regression coefficients to compute a set of anomaly distances between the subset of feature sensors and the target sensor.

In a further variation, the unsupervised machine-learning technique can also include: computing a set of voting scores associated with the set of pair-wise univariate anomaly models by applying a set of clustering functions to the set of anomaly distances; computing a set of weights for the set of voting scores; combining the set of weights and the set of voting scores to detect the anomaly; and quantifying an accountability of the subset of the feature sensors for the detected anomaly event.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 9 shows the pseudocode for detecting an anomaly, according to one embodiment of the present invention.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the technical problem of detecting and accounting for anomalies in operation of industrial machines. More specifically, an anomaly-monitoring-and-detection system can obtain sensor data from target sensors and feature sensors embedded in the machines, preprocess the sensor data to deal with missing values, outliers, and noise. The system then selects only relevant feature sensors for further processing. Specifically, the system uses the relevant feature sensors to build a set of pair-wise univariate anomaly models, with each model corresponding to a pair of a feature sensor and the target sensor. A set of anomaly distances are computed from the set of pair-wise univariate anomaly models. By applying unsupervised machine-learning technique to the set of anomaly distances, followed by a weighted majority voting process, the system can automatically detect anomalies and their associated feature sensors' accountability in operation of the machines.

Data Exploration

Figure 1A:
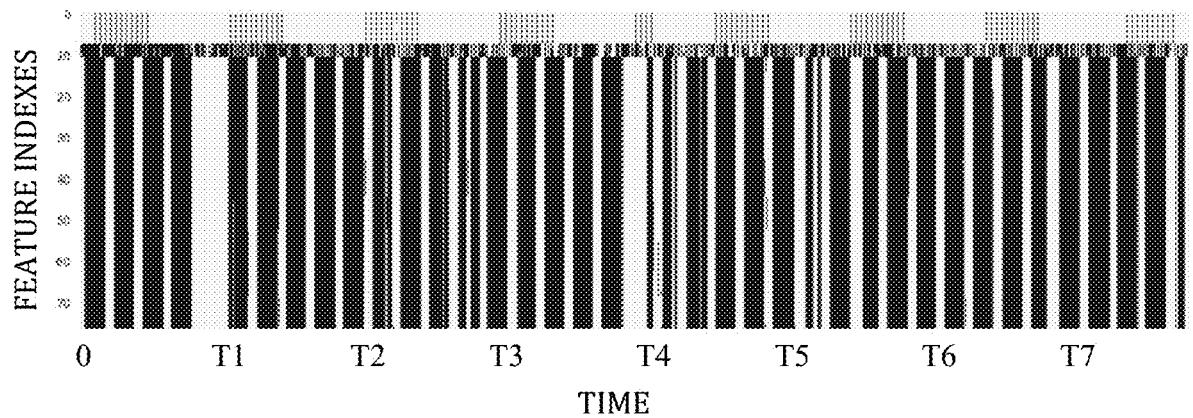
FIG. 1A shows a plot of a set of exemplary recorded sensor data for a plurality of feature indexes over a period of time, according to one embodiment of the present invention.

In many real-world industry IoT applications, sensor data recorded during operation of one or more machines are large in number and often ill-conditioned. In other words, the collected sensor data can include missing, corrupted, noisy, and highly correlated values. FIG. 1A shows a plot of a set of exemplary recorded sensor data for a plurality of feature indexes over a period of time. The dark regions indicate the presence of sensor data, while the light regions indicate the absence of sensor data. As one can see from FIG. 1A, the recorded sensor data include periodic missing values. If anomaly detection techniques are applied to such recorded sensor data that include a large number of missing values then the anomalies detected would be erroneous.

Figure 1B:
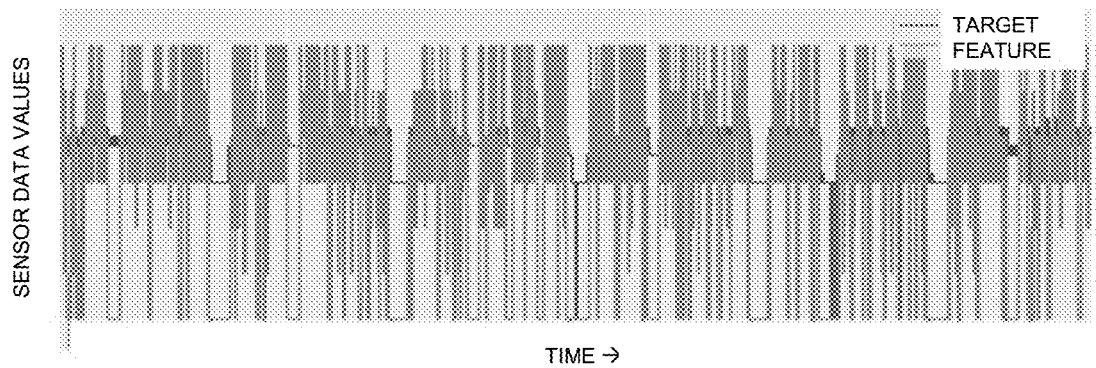
FIG. 1B shows a plot of an exemplary set of target sensor data and feature sensor data recorded during a first time period, according to one embodiment of the present invention.
Figure 1C:
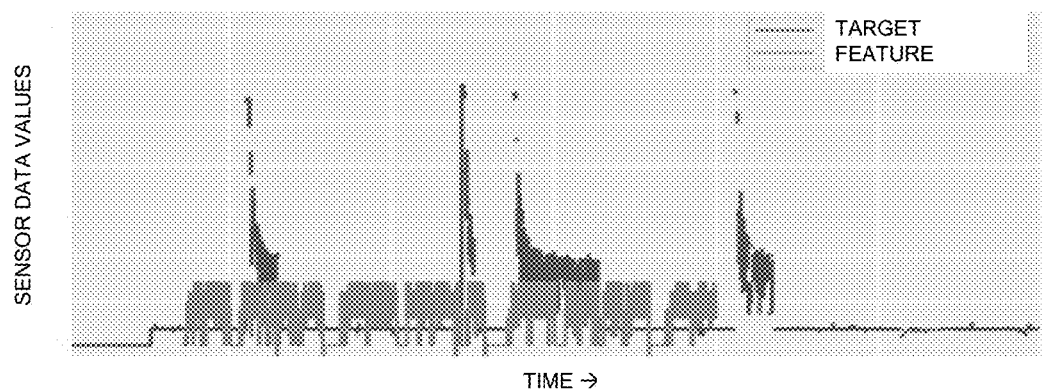
FIG. 1C shows a plot of an exemplary set of the target sensor data and the feature sensor data recorded during a second time period, according to one embodiment of the present invention.

In addition to missing values, other deficiencies can also be present in sensor data. Sensor data can be obtained from a plurality of sensors embedded in one or more machines. From among the plurality of sensors, anomaly associated with one of the sensors may be of interest, this sensor is identified as a target sensor and the remaining sensors can be identified as feature sensors. FIG. 1B shows a plot of an exemplary set of target sensor data and feature sensor data recorded during a first time period. FIG. 1C shows a plot of the target sensor data and the feature sensor data recorded during a second time period. It is evident from FIG. 1B and FIG. 1C that there are significant data variations between the two plots. During the first time period the target sensor data and the feature sensor data have a high correlation (e.g. ~0.87), while in the second time period the correlation is poor (e.g. ~0.3). Therefore, with such dynamic changing characteristics and presence of missing values, analysis of the sensor data becomes very challenging.

Figure 2:
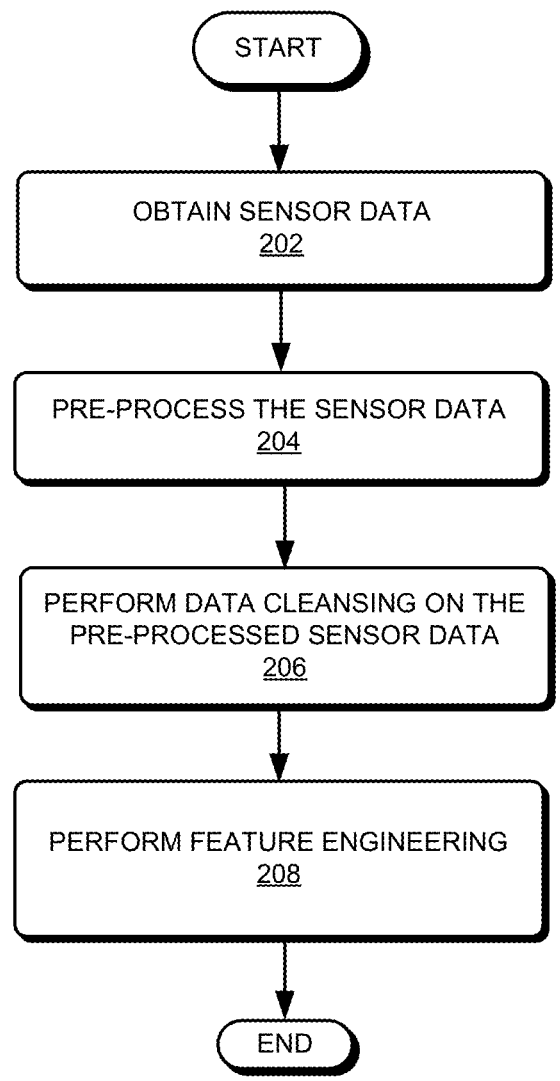
FIG. 2 presents a flowchart illustrating an exemplary process for performing data exploration on sensor data, according to one embodiment of the present invention.

Hence, in order to avoid errors in anomaly detection due to the condition of the sensor data, it is desirable to pre-process the sensor data prior to applying any anomaly detection techniques. FIG. 2 presents a flowchart illustrating an exemplary process for performing data exploration on sensor data, according to one embodiment of the present invention. In some embodiments, the data exploration system can include three modules: a data pre-processing module, a data cleansing module, and a feature engineering module.

During operation, the system can first obtain sensor data (operation 202). The system then pre-processes the sensor data to select a set of feature sensors based on the predetermined target sensor (operation 204). In one embodiment, the system can cleanse the pre-processed sensor data to address missing values, outliers, and noise in the selected sensor data (operation 206). The data cleansing operation can improve quality of the sensor data and reduce the amount of sensor data, thereby also reducing the computational cost. Subsequent to the data cleansing operation, the system performs feature engineering (operation 208). In one embodiment, feature engineering adjusts the delays associated with data from the feature sensors with respect to the target sensor. The delay-shifted feature sensor data are then ranked based on their correlation with the target sensor. Feature sensors that have a high correlation with the target sensor are used for further processing in the anomaly detection system, while feature sensors with low correlation can be omitted.

Figure 3:
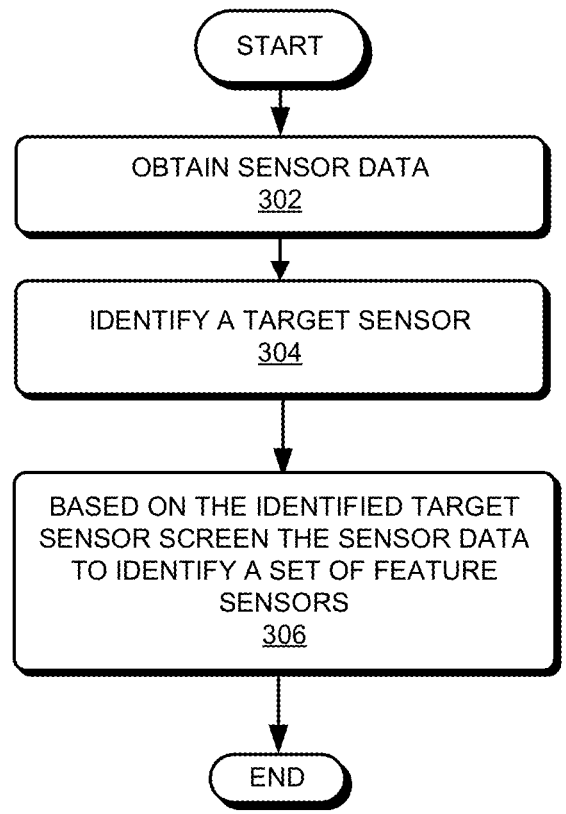
FIG. 3 presents a flowchart illustrating an exemplary process for performing data pre-processing, according to one embodiment of the present invention, in accordance with an embodiment of the present invention.

FIG. 3 presents a flowchart illustrating an exemplary process for performing data pre-processing, according to one embodiment of the present invention. During operation, the system obtains the sensor data (operation 302). The obtained sensor data can include information collected from a plurality of sensors embedded within one or more machines in a factory layout. Data associated with one of the sensors can be identified as a target variable for anomaly analysis (operation 304). Based on the identified target variable, the system automatically screens the sensor data for identifying candidate feature sensor data associated with the target sensor (operation 306). For example, based on available data attributes in the sensor data, sensors that are physically connected to the target sensor in a factory layout can be selected as feature sensors. In one embodiment, a user can also select "user-defined" features for anomaly detection.

Figure 4:
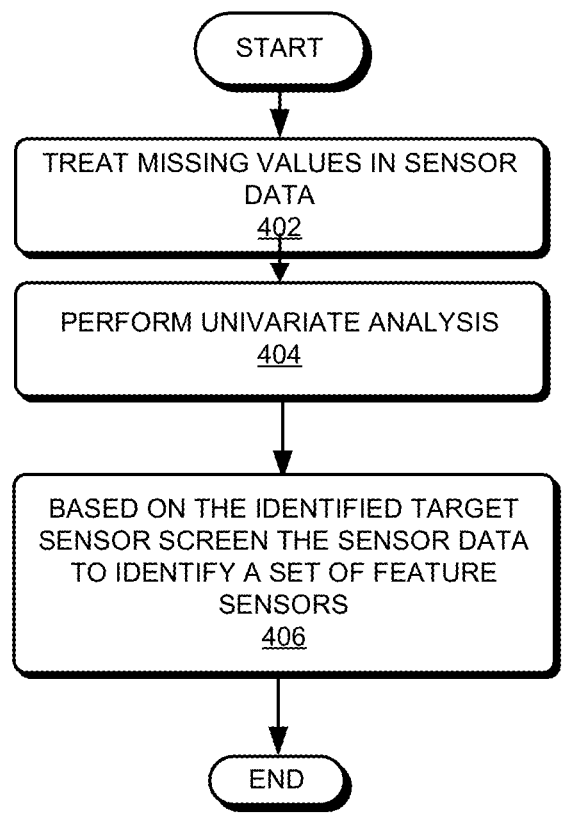
FIG. 4 presents a flowchart illustrating an exemplary process for performing data cleansing, in accordance with an embodiment of the present invention.

Subsequent to performing data selection according to the process illustrated in flowchart in FIG. 2, the data cleansing module can perform data cleansing to address missing values, outliers, and noise in the loaded sensor data. FIG. 4 presents a flowchart illustrating an exemplary process for performing data cleansing, in accordance with an embodiment of the present invention. When a selected candidate feature sensor includes a large portion of missing values during a recording period of the target sensor, e.g., 20% of the recording period, then data associated with this candidate feature sensor can optionally be dropped. If the remaining feature sensors include a small portion of missing values during the recording time of the target sensor, then these missing values are replaced by linear interpolation (operation 402).

After the missing values in the sensor data have been replaced, the system can perform univariate analysis to determine a feature type and to find outliers in each feature sensor data. Typically, there are two kinds of feature types: a monotonical feature type and an instant feature type. Based on these feature types, outliers can be identified and replaced by linear interpolation. In particular, for the instant feature type, the outliers can be found using inter-quartile range (IQR) method. For example, if $x_{ij}$ represents an $i^{th}$ sample of $j^{th}$ feature sensor, then $x_{ij}$ is an outlier if $$x_{ij} \notin [Q_1 - \alpha \cdot IQR, Q_3 + \alpha \cdot IQR] \quad (1)$$

$$IQR = Q_3 - Q_1 \quad (2)$$

$Q_1$ and $Q_3$ correspond to upper and lower quartiles of the feature sensor $x_j$. For monotonical features, an $i^{th}$ sample of $j^{th}$ feature sensor is an outlier if $$x_{ij} - x_{(i-1)j} < 0, \forall i > 0. \quad (3)$$

After the outliers have been identified, the system can replace the outliers by interpolation and reduce other variations in the sensor data by performing a moving average on the sensor data with a pre-defined window size.

Figure 5A:
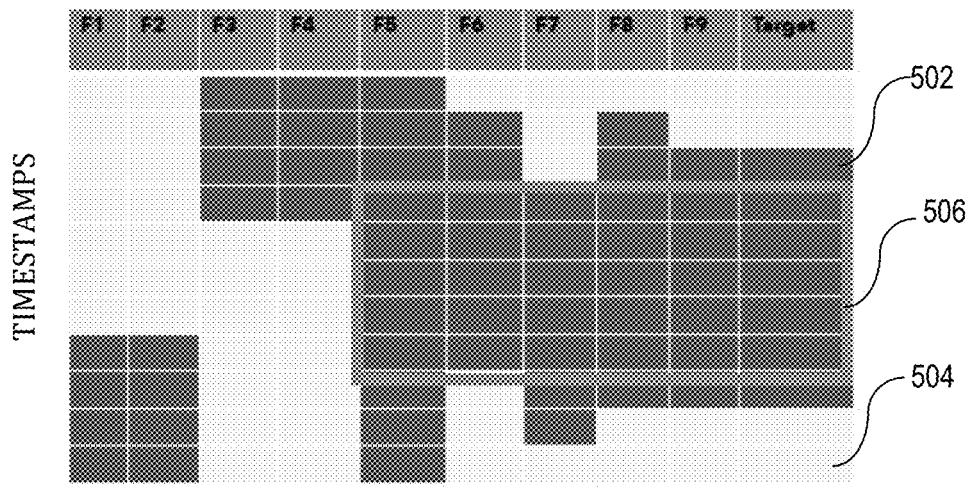
FIG. 5A shows an example of treating missing values in sensor data, according to one embodiment of the present invention.

FIG. 5A shows an example of treating missing values in sensor data, according to one embodiment of the present invention. In particular, FIG. 5A depicts a data map for sensor data recorded over a period of time. The rows in the data map represent timestamps while the columns represent the sensors from which data are being recorded. The sensors from which data are recorded include a target sensor and a set of feature sensors denoted by: {F1, F2, F3, F4, F5, F6, F7, F8, F9}. The darker regions 502 in the data map indicate a recorded sensor data value, while empty or light regions 504 in the data map indicate missing values. Data recorded for feature sensors, e.g., {F5, F6, F7, F8, F9}, during the recording time of the target sensor are selected 506, while the remaining feature sensors that show no data in the data map are dropped.

Figure 5B:
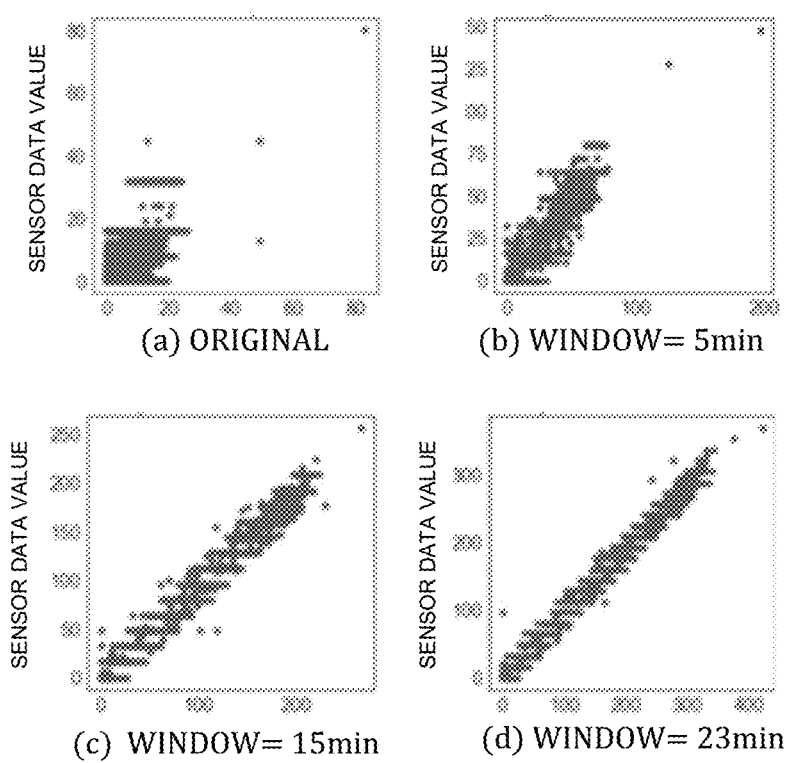
FIG. 5B shows the results of performing moving average on sensor data, according to one embodiment of the present invention.

FIG. 5B shows the results of performing moving average on sensor data, according to one embodiment of the present invention. The sensor data depicted in plot (a) have been previously subject to missing value treatment, univariate analysis and interpolation. Plots (b)-(c) show the sensor data after a moving average of different window sizes have been applied to a sensor data in plot (a).

Figure 6:
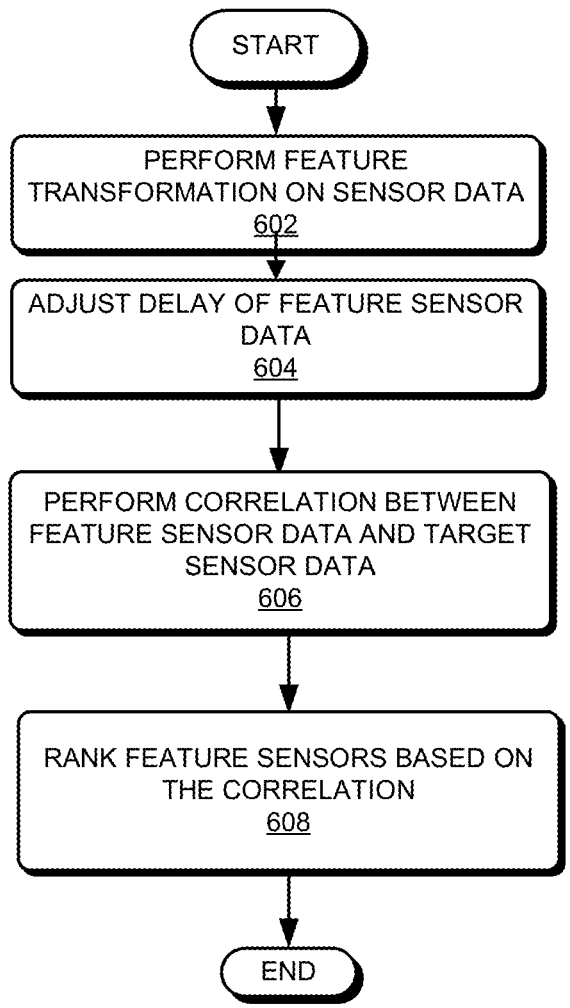
FIG. 6 presents a flowchart illustrating an exemplary process for performing feature engineering, according to one embodiment of the present invention.

Subsequent to performing data cleansing shown in FIG. 4, the system can then apply feature engineering to the sensor data. FIG. 6 presents a flowchart illustrating an exemplary process for performing feature engineering, in accordance with an embodiment of the present invention. During operation, the system performs feature transformation (operation 602) on the monotonical features to calculate their changing rate as new features.

In real-world industrial IoT applications, delay usually exists within data collected from different parts of production lines in a factory layout. Hence, data associated with some of the feature sensors can exhibit a time delay with respect to the target sensor. Delays between the feature sensor data and the target sensor data can be calculated by using normalized cross-correlation (operation 604), which is expressed as:

$$(x_{ij}, y_j) \leftarrow \left( \frac{x_{ij} - \mu_{xj}}{\sigma_{xj}}, \frac{y_i - \mu_y}{\sigma_y} \right) \quad (4)$$

$$z[k] = (x_j * y)(k - N + 1), \forall k = 0, \ldots, \|x_j\| + \|y\| - 2 \quad (5)$$

$$\text{delay} = \underset{k}{\text{argmax}}(z[k]) \quad (6)$$

$$N = \max(\|x_j\|, \|y\|) \quad (7)$$

Where $\mu_{xj}$ and $\mu_y$ represent the mean value of the $j^{th}$ feature sensor and target sensor y, respectively; $\sigma_{xj}$ and $\sigma_y$ represent standard deviation of the $j^{th}$ feature sensor and target sensor y, respectively; (*) represents a convolution operator; $\|x_j\|$ represents the length of $x_j$. The feature sensor $x_j$ is then shifted by the delay calculated in equation (6).

The delay-shifted feature sensors are fed to a feature correlation module. In this module correlation between the delay shifted feature sensor $x_j$ and the target sensor y is calculated (operation 606) by:

$$\rho_{x_j,y} = \text{cov}(x_j, y) / (\sigma_{x_j, \alpha y}) \quad (8)$$

where $\text{cov}(x_j, y)$ represents covariance between $x_j$ and y.

Using the correlation calculated in operation 606 according to equation (8), the system can rank the feature sensors accordingly (operation 608). In one embodiment, the system only selects features that have a correlation value higher than a pre defined threshold $\rho_{threshold}$. This is because features that exhibit low correlation with the target sensor might not be suitable for building a pair-wise univariate anomaly model.

Figure 7A:
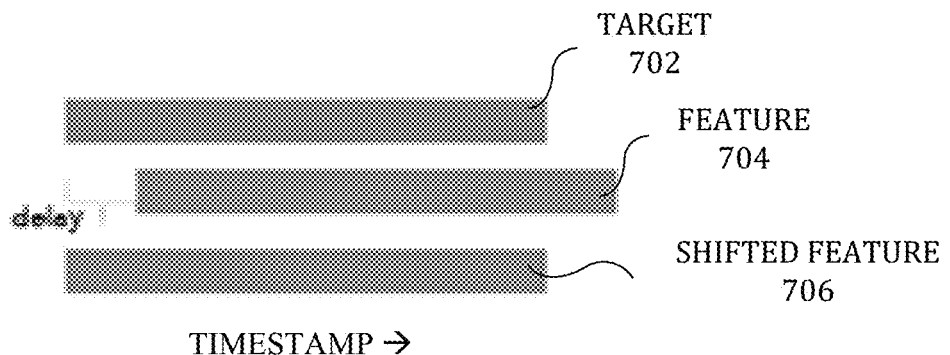
FIG. 7A shows a visualization of a delay adjusted feature, in accordance with an embodiment of the present invention.

FIG. 7A shows a visualization of a feature 704 that is delayed in time with respect to a target variable 702 due to a line layout in a factory, in accordance with an embodiment of the present invention. In order to time-align feature 704 with target 702, the delay in feature 704 is calculated according to equation (6). Feature 704 is then shifted by the delay value calculated from equation (6) to obtain a shifted feature 706.

Figure 7B:
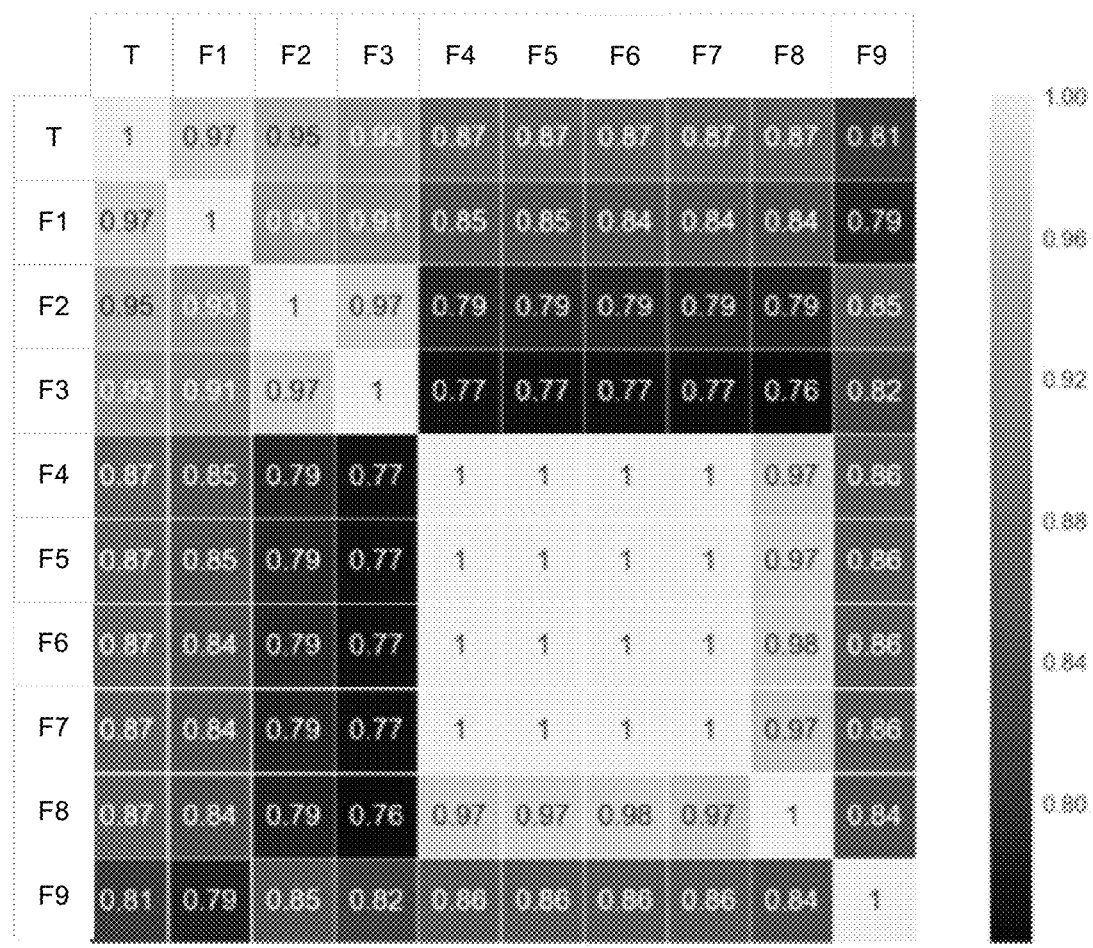
FIG. 7B shows an exemplary data correlation map, according to one embodiment of the present invention.

FIG. 7B shows an exemplary data correlation map between data associated with the target sensor T and data associated with a set of feature sensors: {F1, F2, F3, F4, F5, F6, F7, F8, F9}, according to one embodiment of the present invention. Feature sensors that exhibit a high correlation with target sensor data are selected while feature sensors having low correlation with the target sensor data are omitted. For example, if the pre-defined threshold $\rho_{threshold}$=0.9, then only feature sensors {F1, F2, F3} would be selected. The selected features sensors are then ranked according to their correlation values.

Unsupervised Anomaly Detection System Architecture

Figure 8:
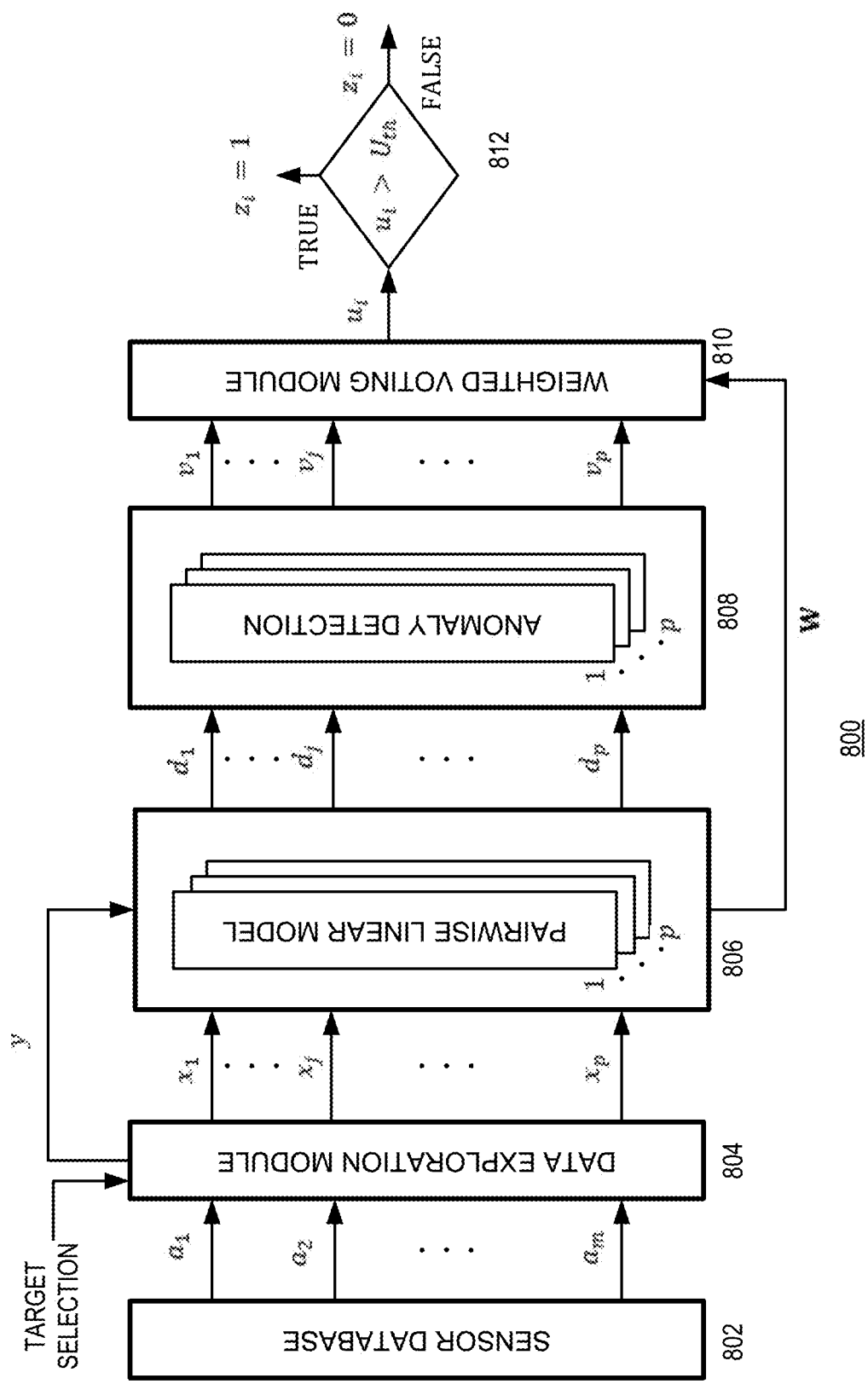
FIG. 8 shows an exemplary unsupervised anomaly detection system architecture, according to one embodiment of the present invention.

FIG. 8 shows an exemplary unsupervised anomaly detection system architecture 800, according to one embodiment of the present invention. The unsupervised anomaly detection system 800 can include a sensor database 802, a data exploration module 804, a model builder module 806, an anomaly detection module 808, and a weighted voting module 810.

The sensor database 802 stores sensor data {$a_1, a_2, \ldots, a_m$} collected from a set of m sensors embedded in one or more machines. The data exploration module 804 can be responsible for automatically processing the sensor data {$a_1, a_2, \ldots, a_m$} to repair the missing values, outliers, and noise. After the missing values, outliers, and noise have been repaired according to the flowcharts shown in FIG. 2-4, a finite set of feature sensors: {$x_1, x_2, \ldots x_j, \ldots, x_p$} (where p<<m) whose sensor data have a high correlation with the target sensor data y are selected. Optimally, the system can omit the remaining feature sensors that exhibit a low correlation. After the data exploration stage, p number of feature sensors and a given target sensor y are available, with each sensor having n time samples. The system can normalize the sensor data to have a zero mean and unit variance for linear regression. In some embodiments, the system can send the normalized data associated with the selected feature sensors {$x_1, x_2, \ldots x_j, \ldots, x_p$} and the target sensor y to another computer system implementing a model builder module 806 to compute anomaly distances.

The model builder model 806 can build a set of pair-wise univariate anomaly models, with each pair-wise univariate anomaly model performing a pair-wise linear regression for a pair of feature sensor $x_j$ and a target sensor y.

Let y denote a normalized target matrix defined by $y=[y_i]_n$, where $y_i$ represents an $i^{th}$ sample of the target sensor for $1 \leq i \leq n$. Similarly, let X denote a normalized feature matrix defined by: $X=[x_{ij}]_{np}$, where $x_{ij}$ represents an $i^{th}$ sample of $j^{th}$ feature sensor for $1 \leq i \leq n$ and $1 \leq j \leq p$. The column vector $X_j=[x_{1j}, x_{2j}, \ldots, x_{nj}]$ represents data from $j^{th}$ feature sensor. Since all the sensor data are normalized, their variance is $Var[y]=Var[X_{.j}]=1$ and mean is $E[y]=E[X_{.j}]=0$.

A pair-wise univariate anomaly model for the $j^{th}$ feature sensor and the target sensor y is computed as follows. First, a functional relationship between a target sensor and a feature sensor is inferred by:

$$\hat{y}_{ij} = x_{ij}\hat{\beta}_j, \forall j=1,2,\ldots,p \tag{9}$$

where $\hat{y}_{ij}$ denote a predicted $i^{th}$ target value for $j^{th}$ feature sensor and $\hat{\beta}_j$ is an estimate regression coefficient parameter. This estimated regression coefficient parameter can be as:

$$\hat{\beta}_j = \arg\min_{\beta} \|X_{.j}\beta - y\| \tag{10}$$

The estimated regression coefficient parameter can be used for measuring fitness of the pair-wise univariate anomaly model. The measure of model fitness is denoted by $R^2$. The model fitness for the $j^{th}$ feature sensor can be denoted as: $R_j^2$, with $0 \leq R_j^2 \leq 1$. A higher value for $R_j^2$ implies a better linear model for the $j^{th}$ feature sensor. Furthermore, the model fitness measure $R_j^2$ for the $j^{th}$ feature sensor is related to the estimated regression coefficient $\hat{\beta}^j$ as follows:

$$R_j^2 = \hat{\beta}_j^2, -1 \leq \hat{\beta}_j \leq 1. \tag{11}$$

After the pair-wise univariate anomaly model has been predicted for the $j^{th}$ feature sensor, an orthogonal difference between an observed target sensor value $y_i$ and the predicted model for the $j^{th}$ feature sensor is determined by:

$$e_{ij} = \frac{\hat{y}_{ij} - y_{ij}}{\sqrt{\hat{\beta}_j^2 + 1}}, \tag{12}$$

$$d_{ij} = |e_{ij}|. \tag{13}$$

where $d_{ij}$ can be referred to as an anomaly distance for $i^{th}$ sample and the $j^{th}$ feature sensor. The mean and variance of the orthogonal difference $e_{ij}$ is given by:

$$E[e_{ij}] = 0, Var[e_{ij}] = \frac{1-R_j^2}{1+R_j^2}.$$

Anomaly distances associated with all the feature sensors $X=[x_{ij}]_{np}$ can be denoted in an anomaly distance matrix form as: $D=[d_{ij}]_{np}$. These anomaly distances are sent to an anomaly detection module 808 to determine a voting score for each model in the set of p pair-wise univariate anomaly models.

The anomaly detection module 808 applies a set of clustering functions to the anomaly distance matrix to determine the voting score. The set of clustering functions can be denoted by: $G=[g_j]_p$. Each clustering function is learnt from $D_j$ independently for $j=1,2,\ldots,p$. Each clustering function classifies an observed anomaly distance into binary outputs. Specifically, an output value is set to 1 if abnormal, otherwise the output value is set to 0. The clustering function $g_j$ can be expressed as:

$$g_j: D_j \mapsto V_j$$

where V denotes a voting matrix defined by $[v_{ij}]_{np}$ and $v_{ij} \in \{0,1\}$. For the set of clustering functions the voting matrix V can be expressed as: V=G(D).

In one embodiment, a Gaussian mixture model (GMM) clustering function G with two centroids (i.e., k=2) is used. Let s denote a random variable, a Gaussian distribution of the random variable is given by: $N(s|\mu_s, \sigma_s)$ with mean $\mu_s$ and standard deviation $\sigma_s$. For the GMM, a probability density function of $d_{ij}$ is expressed in term of the Gaussian distribution by:

$$P_{d_{ij}}(s) = \sum_{k=0,1} \pi_k N(s \mid \mu_k(d_j), \sigma_k(d_j)) \tag{14}$$

where $\pi_k$ represents a weight probability with $0 \leq \pi_k \leq 1$ and $\Sigma_k \pi_k = 1$. The GMM model can be trained by Expectation Maximization (EM) algorithm with training data $\{d_{ij}|i=1, 2, \ldots, n\}$. With the assumption that $\mu_0 < \mu_1$, an anomaly state can be set to abnormal by voting as $v_{ij}=1$, if $GMM_j(d_{ij})=1$, and 0 otherwise.

Although anomalies in feature sensors are voted by using a voting score $v_{ij}$, accuracy of anomaly detection can be improved by performing majority voting in the weighted voting module 810, according to one embodiment. In the weighted voting module 810, an anomaly weighting score at the $i^{th}$ target sample is computed by:

$$W_i = S_i / \|S_i\|_1 \qquad (15)$$

$$u_i = \langle W_i, V_i \rangle \qquad (16)$$

where $S=[s_{ij}]_{np}$ is referred to as anomaly score matrix and denotes an anomaly distance matrix rescaled by each feature sensor's $R^2$ value as: $S_{\cdot j} = R_j^2 D_{\cdot j}$. The operation (a, b) denotes a linear product of a and b. The anomaly score matrix S can be used to visualize an anomaly pattern of a target sensor over time and the contributing feature sensors. Such a visualization can help a user to quickly identify interesting targets with outstanding anomaly patterns.

In one embodiment, the anomaly weight matrix W can be used to quantify each feature sensor's contribution to anomaly voting score. This quantification of each feature sensor's contribution can be used to rank importance of the feature sensors for anomaly.

For all feature sensors, the majority voting $u=[u_i]_n$ can be written as:

$$u = (W \circ V) \cdot 1_p \qquad (17)$$

where $\circ$ is a Hadamard product and 1 is a p×1 unit matrix. A final decision 812 of anomaly for the $i^{th}$ target sample is defined by:

$$z_i = \begin{cases} 0, & \text{normal if } u_i \leq U_{tr} \\ 1, & \text{abnormal if } u_i > U_{tr} \end{cases} \qquad (18)$$

where $0 \leq U_{tr} \leq 1$ is a user-defined majority voting threshold. FIG. 9 shows the pseudocode for detecting an anomaly using an unsupervised anomaly detection method with majority voting, according to one embodiment.

Figure 10:
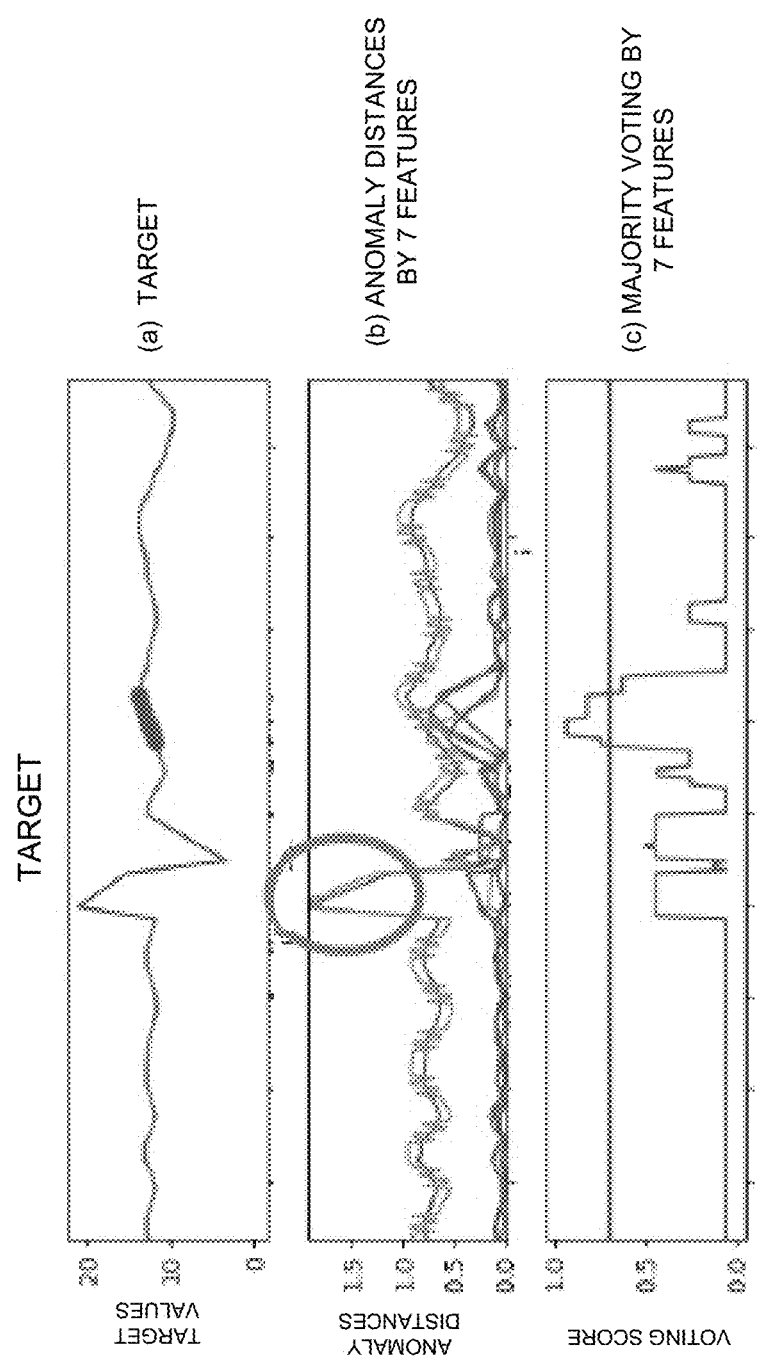
FIG. 10 shows an exemplary unsupervised anomaly detection result, according to one embodiment of the present invention.

FIG. 10 shows an example of an unsupervised anomaly detection result, according to one embodiment of the present invention. The top figure (a) depicts a plot of target sensor values recorded over a period of time. The red region on the curve represents the presence of an anomaly. The second figure (b) in the middle shows a plot of anomaly distances associated with 7 selected feature sensors. The peak in the anomaly distances correspond to a falsely detected anomaly. However, after combining the anomaly distances with majority voting technique, the anomaly detection system is capable of accurately detecting an anomaly in the target sensor data. The last figure (c) shows the result of a majority voting technique by 7 selected feature sensors, according to one embodiment of the present invention. The red line represents the majority voting threshold. The resulting values of weighted anomaly voting that cross the majority voting threshold (red line) correspond to an anomaly. The anomaly values that were marked in the target sensor values (in plot (a)) are detected with high accuracy by the unsupervised anomaly detection system with majority voting.

Figure 11:
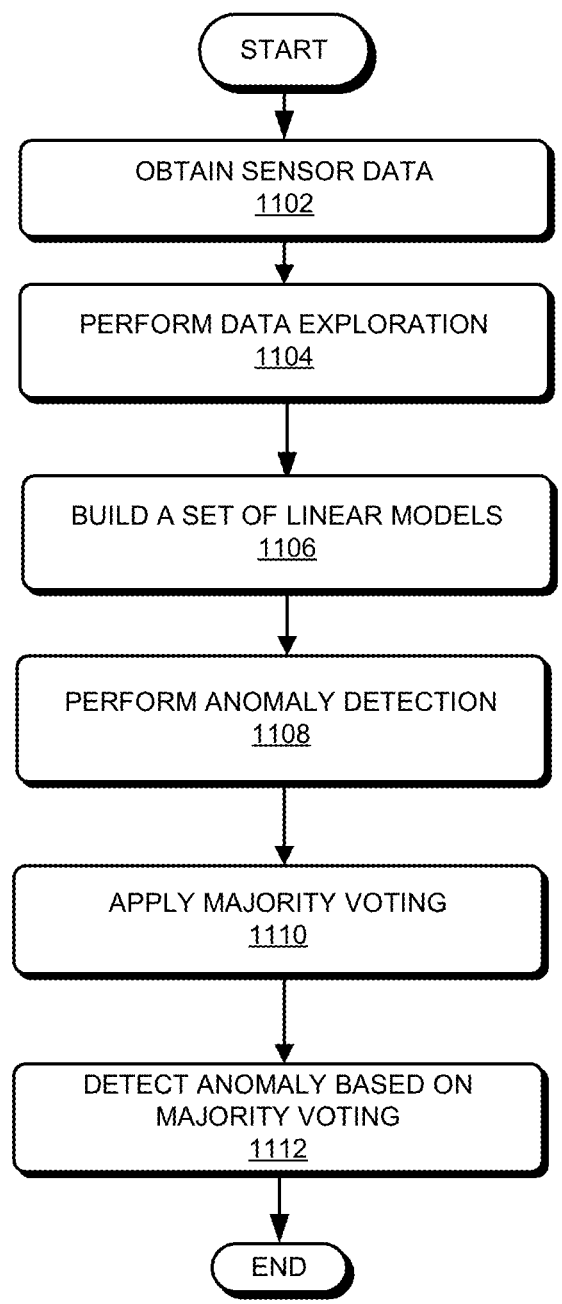
FIG. 11 presents a flowchart illustrating an exemplary process for performing unsupervised anomaly detection with majority voting, according to one embodiment of the present invention.

FIG. 11 presents a flowchart illustrating an exemplary process for performing unsupervised anomaly detection with majority voting, according to one embodiment of the present invention. During operation, the system may obtain sensor data stored in a sensor database (operation 1102). The sensor data is associated with a plurality of sensors embedded in one or more machines in a factory layout.

In industrial IoT applications, due to the availability of increasing number of sensors, the amount of sensor data collected is significantly large. Furthermore, the sensor data usually contain a large number of ill-conditioned data that include missing, corrupted, noisy, and highly correlate values. When such poor quality sensor data are used for anomaly detection, the results would be incorrect and hence unreliable. Furthermore, the computational complexity of anomaly detection would increase significantly due to the availability of large number of sensor data. In order to improve the quality of the sensor data and reduce the number of feature sensors, data exploration is performed on the sensor data (operation 1104).

Subsequent to performing data exploration, the system can build a set of linear models. In other words, the system uses the data associated with each feature sensor and target sensor to build a pair-wise univariate anomaly model and infer a relationship between them. The system computes a set of anomaly distances for the set of feature sensors based on the inferred relationship (operation 1106).

During operation 1108, a set of anomaly "candidate" events are identified. Then based on majority voting in operations 1110 and 1112, they are confirmed as anomaly events, and the accountability is attributed to the feature sensor with highest score. Anomaly events are identified based on the inferred relationships between the target sensor and the set of feature sensors. In particular, a set of anomaly voting scores are calculated based on the set of anomaly distances and a set of clustering functions (operation 1108).

Finally, a collective decision is made for an anomaly by a majority voting procedure (operation 1110). Operation 1110 can be similar to the operation of the weighted voting module 810 shown in FIG. 8.

Exemplary Computer System and Apparatus

Figure 12:
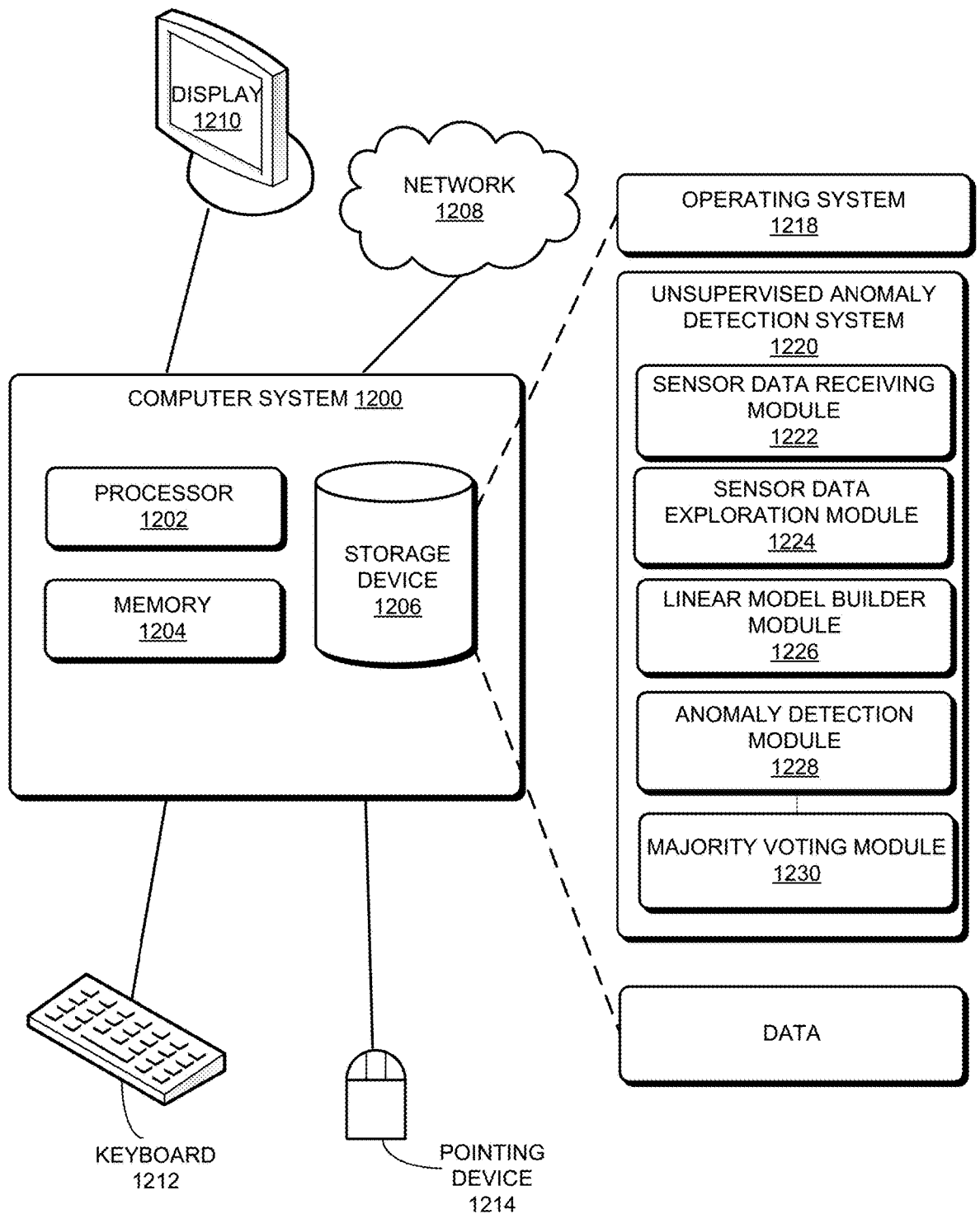
FIG. 12 illustrates an exemplary computer system that facilitates an unsupervised anomaly-detection system, according to one embodiment of the present invention.

FIG. 12 illustrates an exemplary computer system that facilitates an unsupervised anomaly-detection system, according to one embodiment of the present invention. Computer system 1200 includes a processor 1202, a memory 1204, and a storage device 1206. Computer system 1200 can be coupled to a display device 1210, a keyboard 1212, and a pointing device 1214, and can also be coupled via one or more network interfaces to network 1208. Storage device 1206 can store an operating system 1218, and an unsupervised anomaly-detection system 1220.

Unsupervised anomaly-detection system 1220 can include instructions, which when executed by computer system 1200 can cause computer system 1200 to perform methods and/or processes described in this disclosure. Unsupervised anomaly-detection system 1220 can also include instructions for receiving sensor data associated with the one or more sensors (sensor data receiving module 1222), instructions for performing data exploration on the sensor data (sensor data exploration module 1224), and instructions for processing the sensor data after the data exploration stage (linear model builder module 1226). Furthermore, unsupervised anomaly-detection system 1220 can include instructions for detecting anomaly events (anomaly detection module 1228), and instructions for performing majority voting on the detected anomaly events (majority voting module 1230).

Figure 13:
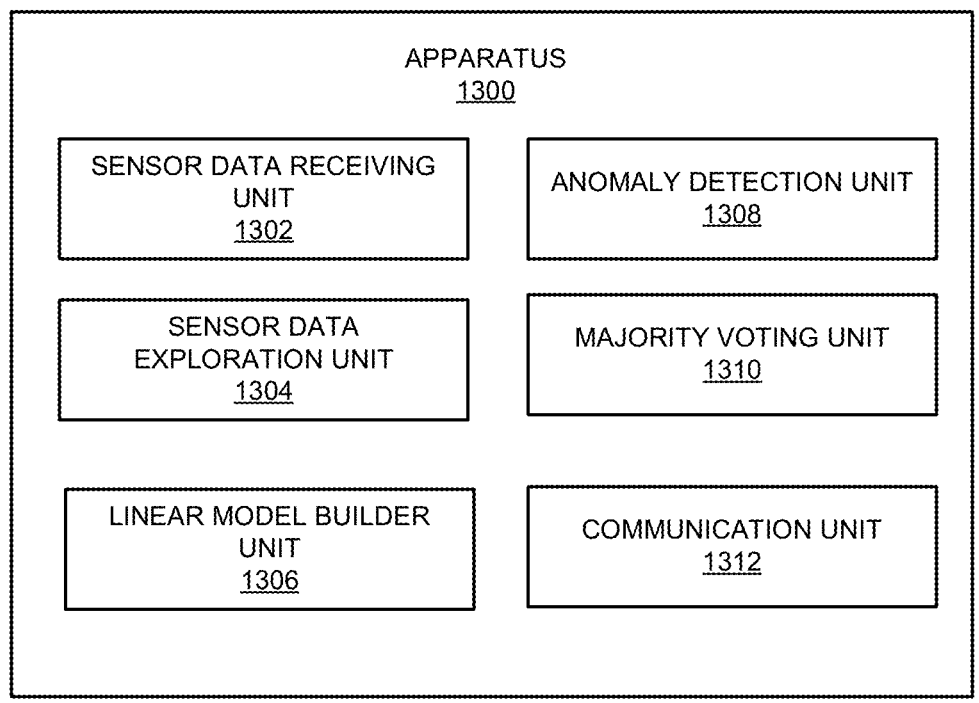
FIG. 13 illustrates an exemplary apparatus that facilitates an unsupervised anomaly-detection system, according to one embodiment of the present invention.

FIG. 13 illustrates an exemplary apparatus that facilitates an unsupervised anomaly-detection system, according to one embodiment of the present invention. Apparatus 1300 can comprise a plurality of units or apparatuses that may communicate with one another via a wired, wireless, quantum light, or electrical communication channel. Apparatus 1300 may be realized using one or more integrated circuits, and may include fewer or more units or apparatuses than those shown in FIG. 13. Further, apparatus 1300 may be integrated in a computer system, or realized as a separate device that is capable of communicating with other computer systems and/or devices. Specifically, apparatus 1300 can comprise units 1302-1312, which perform functions or operations similar to modules 1220-1230 of computer system 1200 of FIG. 12, including: a sensor data receiving unit 1302, a sensor data exploration unit 1304, a linear model builder unit 1306, an anomaly detection unit 1308, and a majority voting unit 1310. Apparatus 1300 can further include a communication unit 1312.

In general, embodiments of the present invention provide a method and system to detect and account for anomalies in high-dimensional and unlabeled sensor data using unsupervised learning with majority voting. Detecting anomalies in sensor date associated with factory machines has been used as an example. In practice, this solution is not limited to detecting anomalies associated with factory machines. It can also be used to detect anomalies in other types of equipment or machinery.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting an anomaly in operation of a machine, the method comprising:
    recording, via a set of sensors associated with the machine, to obtain sensor data associated with the machine while the machine is operating, wherein the set of sensors include a target sensor and a set of feature sensors;
    storing the sensor data in computing device;
    performing data exploration on the stored sensor data including repairing missing values and ranking the set of feature sensors, wherein the data exploration comprises one or more of:
        improving quality of the sensor data;
        identifying a subset of feature sensors from the set of feature sensors that are relevant for subsequent processing; and
        reducing amount of sensor data and hence computational cost involved in the subsequent processing;
    performing, based on the identified subset of feature sensors and the target sensor, unsupervised machine-learning to build a set of pair-wise univariate models; and
    determining whether and how an anomaly occurs in the operation of the machine based on the set of pair-wise univariate models.

2. The method of claim 1, wherein performing data exploration on the stored sensor data further comprises one or more of:
    applying a data pre-processing technique;
    applying a data cleansing technique; and
    applying a feature engineering technique.

3. The method of claim 2, wherein applying the data cleansing technique comprises:
    replacing missing values in the sensor data by linear interpolation, when an amount of the missing values during a recording period of target sensor data is less than a threshold value; and
    dropping missing values in the sensor data, when the amount of missing values during the recording period of the target sensor data is more than the threshold value.

4. The method of claim 2, wherein applying the feature engineering technique comprises:
    adjusting a set of time delay between a set of feature sensors and target sensor data;
    computing a correlation between the delay adjusted set of feature sensors and the target sensor; ranking the set of feature sensors based on their correlation values; and
    selecting a subset of feature sensors from the ranked set of feature sensors.

5. The method of claim 1, wherein each pair-wise univariate anomaly model from the set of pair-wise univariate anomaly models is associated with a feature sensor from the subset of feature sensors and a target sensor.

6. The method of claim 1, wherein performing, based on the identified subset of feature sensors and the target feature sensor, unsupervised machine-learning to build the set of pair-wise univariate models comprises:
    determining a set of regression coefficients for measuring a fitness of the set of pair-wise univariate anomaly models;
    using the set of regression coefficients to compute a set of anomaly distances between the subset of feature sensors and the target sensor; and
    training, based on the set of anomaly distances, a set of Gaussian Mixture Models by expectation-maximization to determine a set of voting scores.

7. The method of claim 1, wherein performing, based on the identified subset of feature sensors and the target feature sensor, unsupervised machine-learning to build the set of pair-wise univariate models further comprises:
    computing a set of voting scores associated with the set of pair-wise univariate anomaly models by applying a set clustering functions to a set of anomaly distances;
    computing a set of weights for the set of voting scores;
    combining the set of weights and the set of voting scores to detect the anomaly; and
    computing each feature sensors' accountability for a detected anomaly event.

8. An apparatus for detecting an anomaly in operation of a machine, comprising:
one or more processors;
a set of sensors embedded in the one or more machines; and
memory storing instructions that, when executed by the one or more processors, cause the apparatus to:
recording, via a set of sensors associated with the machine, to obtain sensor data associated with the machine while the machine is operating, wherein the set of sensors include a target sensor and a set of feature sensors;
store the sensor data in the computing device;
perform data exploration on the stored sensor data including repairing missing values and ranking the set of feature sensors, wherein the data exploration comprises one or more of:
improving quality of the sensor data;
identifying a subset of feature sensors from the set of feature sensors that are relevant for subsequent processing; and
reducing amount of sensor data and hence computational cost involved in the subsequent processing;
perform, based on the identified subset of feature sensors and the target sensor, unsupervised machine-learning to build a set of pair-wise univariate models; and
determine whether and how an anomaly occurs in the operation of the machine based on the set of pair-wise univariate models.

9. The apparatus of claim 8, wherein performing data exploration on the stored sensor data further comprises one or more of:
applying a data pre-processing technique;
applying a data cleansing technique; and
applying a feature engineering technique.

10. The apparatus of claim 9, wherein applying the data cleansing technique comprises:
replacing missing values in the sensor data by linear interpolation, when an amount of the missing values during a recording period of target sensor data is less than a threshold value; and
dropping missing values in the sensor data, when the amount of missing values during the recording period of the target sensor data is more than the threshold value.

11. The apparatus of claim 9, wherein applying the feature engineering technique comprises:
adjusting a set of time delay between a set of feature sensors and target sensor data;
computing a correlation between the delay adjusted set of feature sensors and the target sensor;
ranking the set of feature sensors based on their correlation values; and
selecting a subset of feature sensors from the ranked set of feature sensors.

12. The apparatus of claim 8, wherein each pair-wise univariate anomaly model from the set of pair-wise univariate anomaly models is associated with a feature sensor from the subset of feature sensors and a target sensor.

13. The apparatus of claim 8, wherein performing based on the identified subset of feature sensors and the target feature sensor, unsupervised machine-learning to build the set of pair-wise univariate models comprises:
determining a set of regression coefficients for measuring a fitness of the set of pair-wise univariate anomaly models;
using the set of regression coefficients to compute a set of anomaly distances between the subset of feature sensors and the target sensor; and
training, based on the set of anomaly distances, a set of Gaussian Mixture Models by expectation-maximization to determine a set of voting scores.

14. The apparatus of claim 8, wherein performing, based on the identified subset of feature sensors and the target feature sensor, unsupervised machine-learning to build the set of pair-wise univariate models further comprises:
computing a set of voting scores associated with the set of pair-wise univariate anomaly models by applying a set clustering functions to thea set of anomaly distances;
computing a set of weights for the set of voting scores;
combining the set of weights and the set of voting scores to detect the anomaly; and
computing each feature sensors' accountability for a detected anomaly event.

15. A non-transitory computer-readable storage medium storing instructions that when executed by a computer cause the computer to perform a method for detecting an anomaly in operation of a machine, the method comprising:
recording, via a set of sensors associated with the machine, to obtain sensor data associated with the machine, wherein the set of sensors include a target sensor and a set of feature sensors;
storing the sensor data in the computing device;
performing data exploration on the stored sensor data including repairing missing values and ranking the set of feature sensors, wherein the data exploration comprises one or more of:
improving quality of the sensor data;
identifying a subset of feature sensors from the set of feature sensors that are relevant for subsequent processing; and
reducing amount of sensor data and hence computational cost involved in the subsequent processing;
performing, based on the identified subset of feature sensors and the target sensor, unsupervised machine-learning to build a set of pair-wise univariate models; and
determining whether and how an anomaly occurs in the operation of the machine based on the set of pair-wise univariate models.

16. The non-transitory computer-readable storage medium of claim 15, wherein performing data exploration on the stored sensor data further comprise one or more of:
applying a data pre-processing technique;
applying a data cleansing technique; and
applying a feature engineering technique.

17. The non-transitory computer-readable storage medium of claim 16, wherein applying the feature engineering technique comprises:
adjusting a set of time delays between a set of feature sensors and target sensor data;
computing a correlation between the delay adjusted set of feature sensors and the target sensor;
ranking the set of feature sensors based on their correlation values; and
selecting a subset of feature sensors from the ranked set of feature sensors.

18. The non-transitory computer-readable storage medium of claim 15, wherein each pair-wise univariate anomaly model from the set of pair-wise univariate anomaly models is associated with a feature sensor from the subset of feature sensors and a target sensor.

19. The non-transitory computer-readable storage medium of claim 15, wherein performing, based on the identified subset of feature sensors and the target feature sensor, unsupervised machine-learning technique to build the set of pair-wise univariate models comprises:
  determining a set of regression coefficients for measuring a fitness of the set of pair-wise univariate anomaly models;
  using the set of regression coefficients to compute a set of anomaly distances between the subset of feature sensors and the target sensor; and
  training, based on the set of anomaly distances, a set of Gaussian Mixture Models by expectation-maximization to determine a set of voting scores.

20. The non-transitory computer-readable storage medium of claim 15, wherein performing, based on the identified subset of feature sensors and the target feature sensor, the unsupervised machine-learning technique to build the set of pair-wise univariate models further comprises:
  computing a set of voting scores associated with the set of pair-wise univariate anomaly models by applying a set clustering functions to a set of anomaly distances;
  computing a set of weights for the set of voting scores;
  combining the set of weights and the set of voting scores to detect the anomaly; and
  computing each feature sensors' accountability for a detected anomaly event.

* * * * *